(12) United States Patent  
Anker

(10) Patent No.: US 7,997,429 B2  
(45) Date of Patent: *Aug. 16, 2011

(54) POT AND PAN STORAGE UNIT

(76) Inventor: Elliot Anker, Cooper City, FL (US)

(*) Notice: Subject to any disclaimer, the term of this patent is extended or adjusted under 35 U.S.C. 154(b) by 651 days.

This patent is subject to a terminal disclaimer.

(21) Appl. No.: 11/426,378

(22) Filed: Jun. 26, 2006

(65) Prior Publication Data

US 2007/0295683 A1    Dec. 27, 2007

(51) Int. Cl.
*A47B 43/00* (2006.01)

(52) U.S. Cl. .................... 211/186; 211/41.11

(58) Field of Classification Search .............. 211/13.1, 211/189, 186, 41.11, 204, 206, 192, 85.23, 211/60.1; 108/180, 186, 187, 101, 190, 28; 47/39, 40, 44, 45, 47, 82, 83
See application file for complete search history.

(56) References Cited

U.S. PATENT DOCUMENTS

| 311,408 | A | * | 1/1885 | Butcher | 108/26 |
| 963,030 | A | * | 7/1910 | Balch | 126/30 |
| 1,112,558 | A | * | 10/1914 | Red | 248/129 |
| 1,560,404 | A | * | 11/1925 | Brown | 47/47 |
| 1,724,385 | A | * | 8/1929 | Weston | 211/130.1 |
| 1,735,879 | A | * | 11/1929 | Reynolds | 312/240 |
| 2,148,548 | A | * | 2/1939 | Gregory | 211/85 |
| 2,763,096 | A | * | 9/1956 | Roger | 47/45 |
| 2,972,414 | A | * | 2/1961 | Sipe | 211/41.11 |
| 3,100,459 | A | * | 8/1963 | Liss et al. | 108/91 |
| 4,275,666 | A | * | 6/1981 | Schriever | 108/101 |
| 4,442,778 | A | * | 4/1984 | Lang | 108/186 |
| 4,561,208 | A | * | 12/1985 | Schultz | 47/83 |
| 4,922,653 | A | * | 5/1990 | Stone | 47/45 |
| 5,047,210 | A | * | 9/1991 | Melet | 422/64 |
| 5,220,744 | A | * | 6/1993 | Kendall | 47/39 |
| 5,347,751 | A | * | 9/1994 | Carpay | 47/39 |
| 5,640,802 | A | * | 6/1997 | Elliott | 47/45 |
| 6,050,529 | A | * | 4/2000 | Lin | 248/121 |
| 6,327,242 | B1 | * | 12/2001 | Amicangioli et al. | 370/216 |
| 6,918,563 | B2 | * | 7/2005 | Tseng | 248/146 |
| 7,188,448 | B2 | * | 3/2007 | Sedlacek | 47/47 |
| D541,603 | S | * | 5/2007 | Anker | D7/704 |
| 7,340,859 | B2 | * | 3/2008 | Palsrok | 47/39 |
| 2005/0039394 | A1 | * | 2/2005 | Kelly | 47/45 |
| 2005/0144839 | A1 | * | 7/2005 | Morgan et al. | 47/45 |
| 2008/0256856 | A1 | * | 10/2008 | Rosaen | 47/45 |

* cited by examiner

*Primary Examiner* — Jennifer E. Novosad
(74) *Attorney, Agent, or Firm* — Robert M. Schwartz

(57) ABSTRACT

An article for storing and supporting pots and pans wherein said article is formed of more than two identical vertical members, each vertical member having a plurality of respective horizontal support members incorporated thereon for supporting a plurality of respective horizontal shelves.

9 Claims, 7 Drawing Sheets

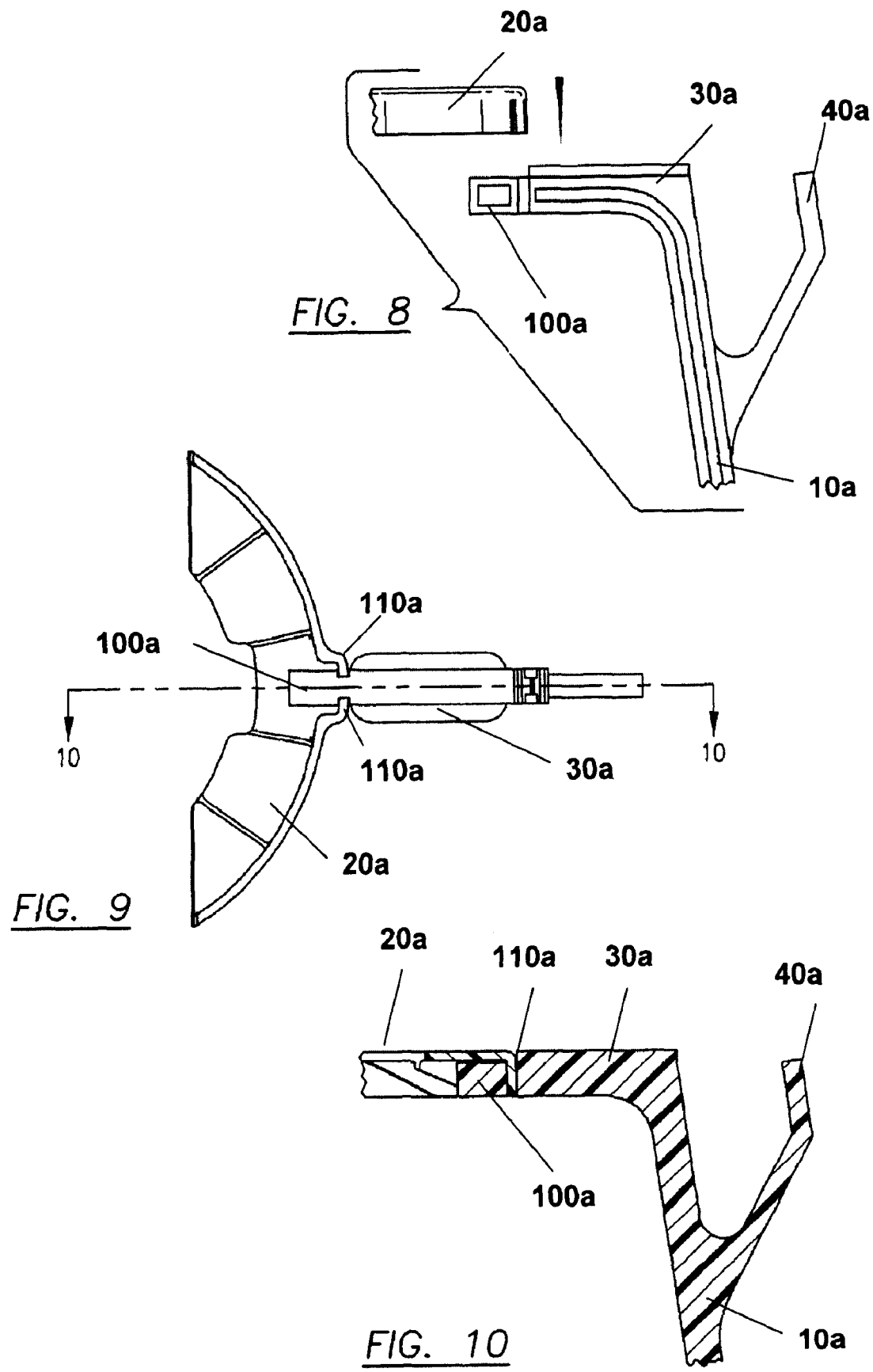

POT AND PAN STORAGE UNIT

BACKGROUND OF THE INVENTION

The kitchen is a place where convenience is always examined and attempts are made to improve. One particular area that receives constant attention is kitchen storage. There have been many articles that have attempted, with varying levels of success, to improve upon convenience and storage in the kitchen U.S. Pat. No. 1,211,269 relates to a storage rack comprising interconnected wire material. While this may be suitable for plates or small pans, the arrangement would not be stable for larger pots and pans.

U.S. Pat. No. 5,765,700 relates to a storage rack that has a flanged base to provide stability of the article while in use. However, the hooks intended for hanging the pots and pans would cause difficulties where storage space is not plentiful.

US Patent Application Publication No. 2004/0099617 addresses the issue of storage space. This application proposes an article that is placed over a kitchen sink comprising storage area within the perimeter of the article and hooks for hanging pots on the outer perimeter. This may not be aesthetic pleasing to have this article permanently in view over the kitchen sink.

There is a need for a simple, low cost article for safely and effectively storing pots and pans that does not take up much space and may, if needed be either hidden from view, or placed an inconspicuous area.

SUMMARY OF THE INVENTION

The article of the present invention addresses many of the limitations found in prior attempts. The present article may be inexpensively produced because there are only two distinctly shaped components. The vertical members of the present invention each have identical size and shape as do the shelves. Therefore, the present invention may be inexpensively and easily produced by well-known means, such as injection molding, and only two distinct shapes need be made.

In a preferred embodiment, the present invention relates to an article for storing pots and pans comprising:
(a) vertical members with engaging interlocks; and
(b) horizontal shelves with receiving interlocks that attach in concert with said engaging interlocks to secure the shelves into a fixed position.

Additionally, each horizontal shelf has a receiving interlock suitable for interacting with a single interlock of said engaging interlocks.

In a preferred embodiment, each of said horizontal shelf supports is of equal size.

Alternatively, one may configure the article wherein each said horizontal shelf supports is a different size.

In a preferred embodiment, each horizontal shelf support has an identical configuration.

Each horizontal shelf have an inner cavity for receiving pots and pans.

Further the article comprises three (3) identically shaped vertical members.

In one embodiment, the article comprises four identically shaped horizontal shelves and three identically shaped vertical members.

The article has a base on which to stand. To form the base, each vertical member has a horizontal shelf attached on its lowermost horizontal shelf support extending along the bottom of the article to form a base.

In a preferred embodiment each horizontal shelf support forms an acute angle with the vertical member.

The horizontal shelves are connected with interlocks to each of the vertical members.

In another preferred embodiment, the present invention is a storage shelf system comprising:
(a) vertical members with engaging interlocks; and
(b) horizontal shelves with receiving interlocks that attach in concert with said engaging interlocks to secure the shelves into a fixed position, wherein said vertical members are identically shaped and said horizontal members are identically shaped.

In another preferred embodiment, the article is assembled and arranged to fit within an existing cabinet position.

It is an object of the present invention to provide an article for the storage of pots and pans.

It is another object of the present invention to provide an article for the storage of pots and pans that is easily assembled.

It is another object of the present invention to provide an article for the storage of pots and pans that is inexpensive to produce.

It is another object of the present invention to provide an article for the storage of pots and pans that assembles by using components of two distinct configurations.

It is another object of the present invention to provide an article for the storage of pots and pans that assembles without the use of hardware.

It is another object of the present invention to provide an article for the storage of pots and pans that remain assembled without the use of hardware.

BRIEF DESCRIPTION OF THE DRAWINGS

FIG. 8 shows an enlargerd side view with directional notation of a shelf in position to be connected to a horizontal support.

FIG. 9 shows a bottom view of a shelf connected to a horizontal support.

FIG. 10 shows a sectional view of a shelf connected to a horizontal support, from FIG. 9.

DETAILED DESCRIPTION OF THE PREFERRED EMBODIMENTS

The article of the present invention is produced and assembled in a manner superior to other articles. Each vertical member is identical as is each shelf. Therefore, in the molding process, the fabricators only need two molds for the two required shapes. The present invention is therefore desirable over other similar articles in that the manufacturing costs are greatly reduced. Further, the article of the present invention is more desirable for the user. Unlike other articles that require assembling numerous discrete components, often with various tools and hardware to achieve the completed article, the article of the present invention only has two discrete shaped components and assembles without tools or hardware.

In a preferred embodiment, the horizontal shelf support that extends from the lowermost point on the vertical member will form a base for the article. Attaching each lowermost horizontal shelf support to a single shelf will form the base. The horizontal shelf support will be formed in relation to the vertical member such that an acute angle is created. The acute angle provides stability for the assembled article by lowering the center of gravity of the loaded article to prevent the article from tipping. In a preferred embodiment the said acute angle is between 50° and 85°.

In another preferred embodiment, the article of the present invention assembles without tools. The assembly is accomplished through incorporated interlocks. Each shelf comprises three regions that have incorporated into the structure a complimentary interlock that interacts with a grasping interlock incorporated into the distal end of each horizontal shelf support. When assembling, the user will line up the complimentary interlock with the grasping interlock and apply gentle pressure until the interlock is engaged. Once engaged, the interlock will hold the shelf into position. The interlock is so formed such that is takes application of pressure to disassemble in order that the completely assembled article be stable in the environment of use.

In another preferred embodiment, the article comprises three vertical members that are connected about the perimeter of the shelves.

In another preferred embodiment, the article comprises three vertical members that are connected about the circumference of the shelves.

Figure 1:
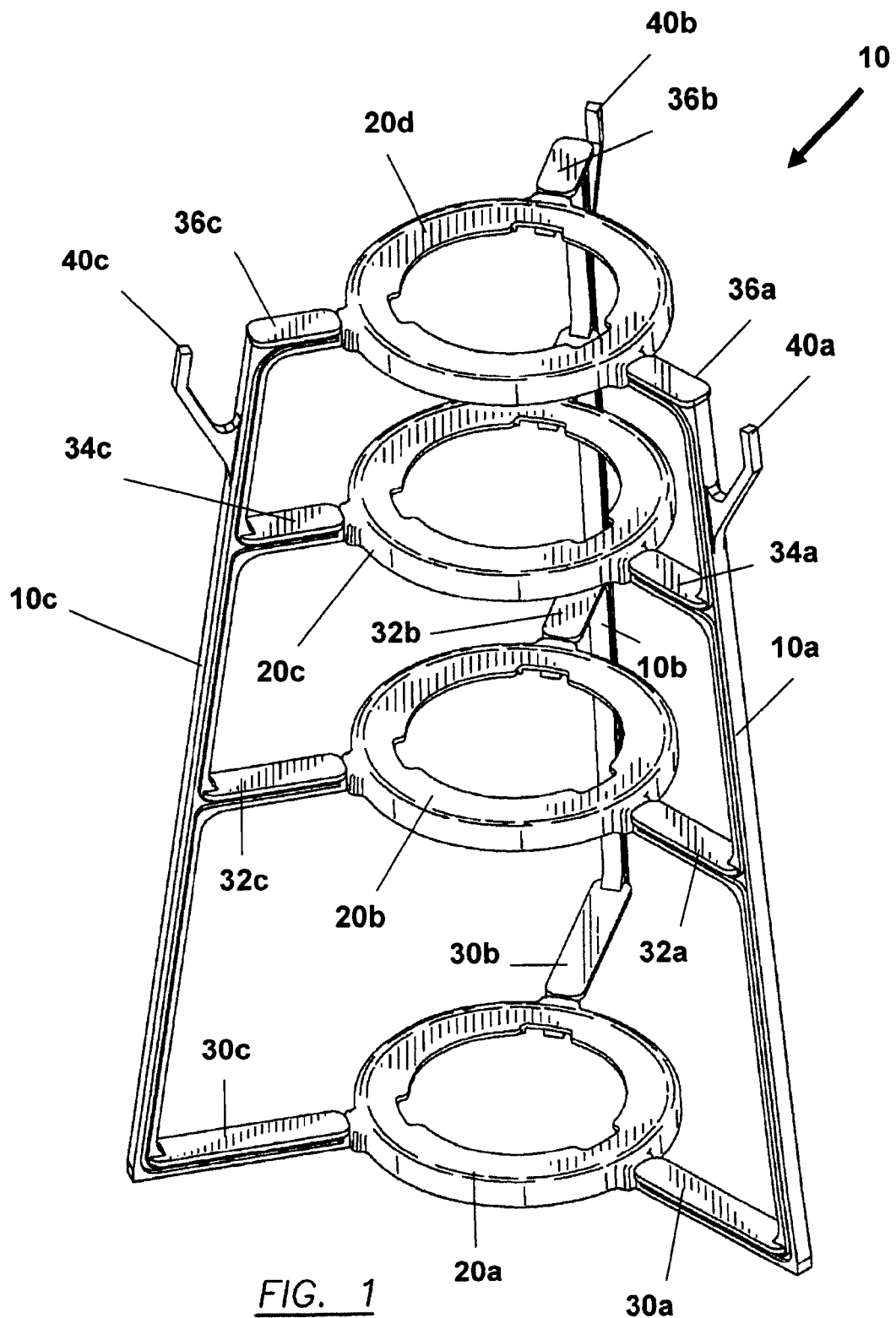
FIG. 1 shows a perspective view of the assembled article.

A prospective view of an embodiment of the present invention 10 is shown in FIG. 1. In the embodiment depicted, each vertical member 10a, 10b, and 10c, will form the outer frame of the article. The user will assemble the article by attaching each vertical member to shelves 20a, 20b, 20c and 20d. The user will hold vertical member 10a perpendicular to the assembling surface. Horizontal support 30a connects to shelf 20a through incorporated interlocks. The user will then hold vertical member 10b perpendicular to the assembling surface. Horizontal support 30b connects to shelf 20a through incorporated interlocks. The user will hold vertical member 10c perpendicular to the assembling surface. Horizontal support 30c connects to shelf 20a through incorporated interlocks. Each of horizontal supports 30a, 30b, and 30c, acting in concert, with shelf 20a will form the base of the article.

Then the user will attach each of horizontal supports 32a, 32b, and 32c, connecting to shelf 20b through incorporated interlocks. Then the user will attach each of horizontal supports 34a, 34b, and 34c, connecting to shelf 20c through incorporated interlocks. Finally, the user will attach each of horizontal supports 36a, 36b, and 36c, connecting to shelf 20d through incorporated interlocks. Once the article is assembled, it is stood up such that is rests on a base formed by horizontal supports 30a, 30b, and 30c, connected to shelf 20a.

The depicted embodiment further shows hooks 40a, 40b, and 40c for supporting a pot or pan (not shown) or other item desired to be hung from the pot and pan storage unit 10, that are incorporated into the upper, outer sides of each of vertical members 10a, 10b, and 10c respectively.

Figure 2:
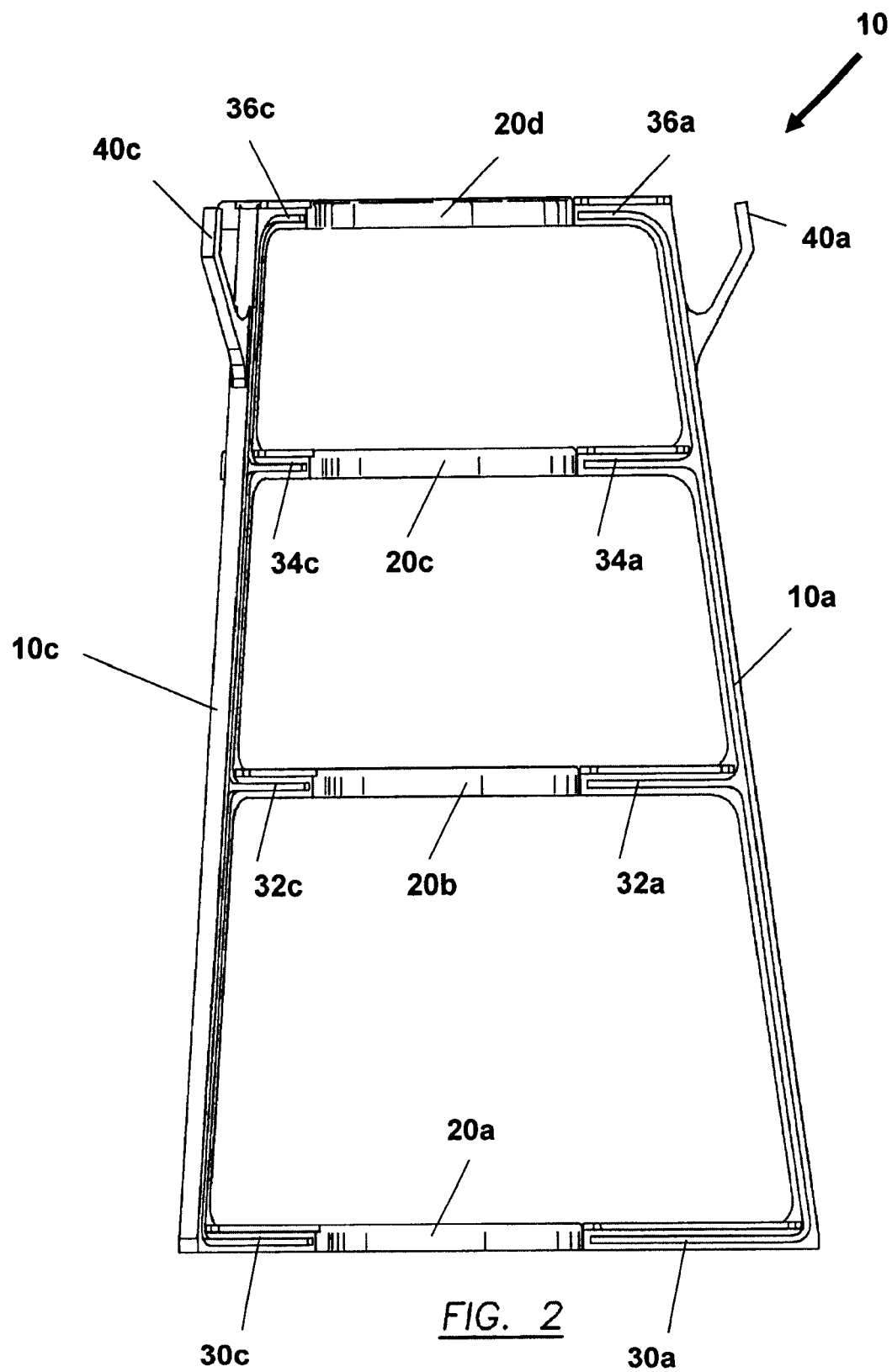
FIG. 2 shows a side view of the assembled article.

FIG. 2 shows a side view where the connection between each of horizontal supports 30a and 30c connected to shelf 20a; horizontal supports 32a and 32c connected to shelf 20b; horizontal supports 34a and 34c connected to shelf 20c; and horizontal supports 36a and 36c connected to shelf 20d.

Figure 3:
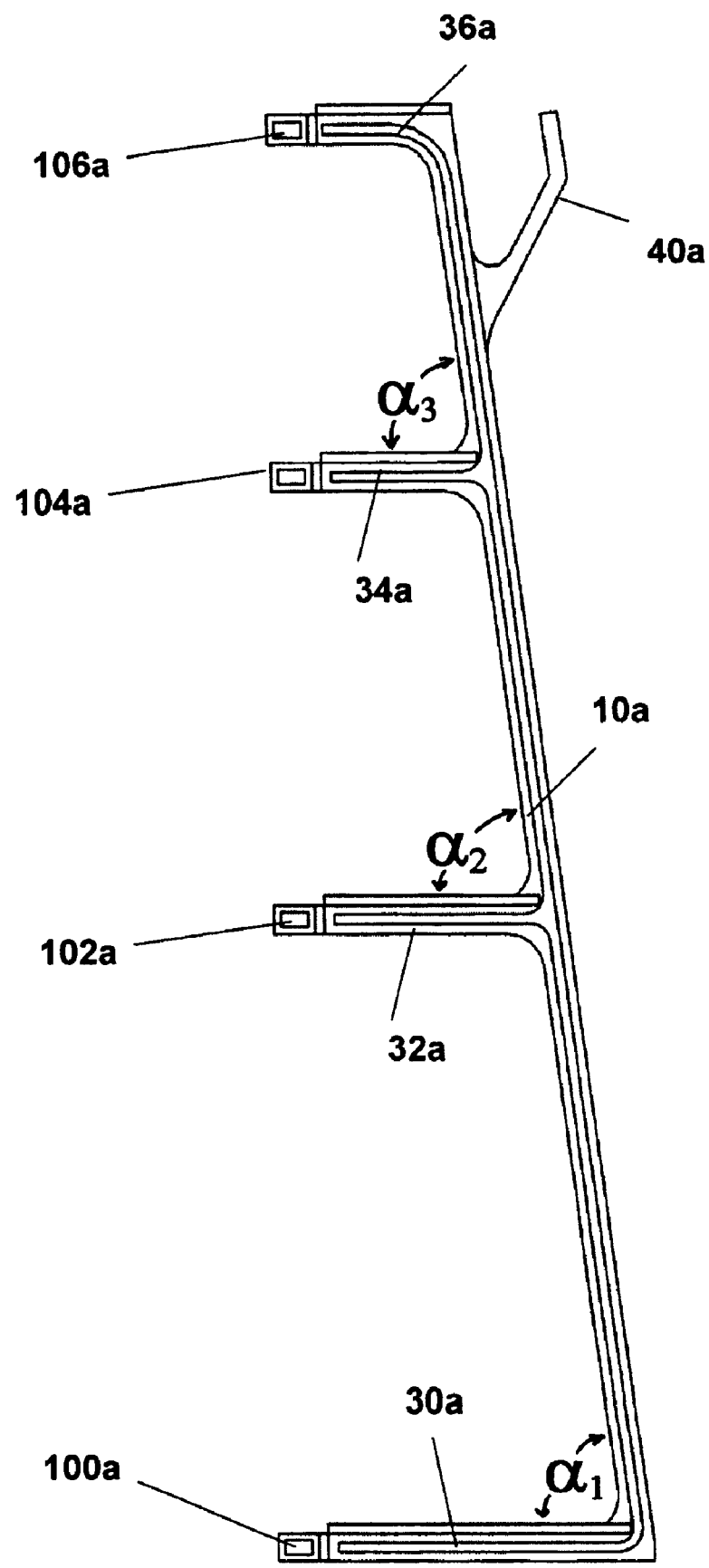
FIG. 3 shows a side view of one of three vertical members of the article.

A side view of a single vertical member 10a is shown in FIG. 3. Each of horizontal supports 30a, 32a, 34a, and 36a are parallel to each other and connected to vertical support 10a. Each of the horizontal shelf supports form congruent interior angles $\alpha_1$, $\alpha_2$, $\alpha_3$. In a preferred embodiment, the interior angles are acute angles. Preferred angled are from 50-85°. Most preferred are interior angles from 70-85°. Further, the terminal ends, in this view meaning the end not in contact with vertical support 10a, of each of horizontal shelf supports 30a, 30b, 30c, and 30d, comprised corresponding interlocks 100a, 100b, 100c, and 100d respectively.

Figure 4:
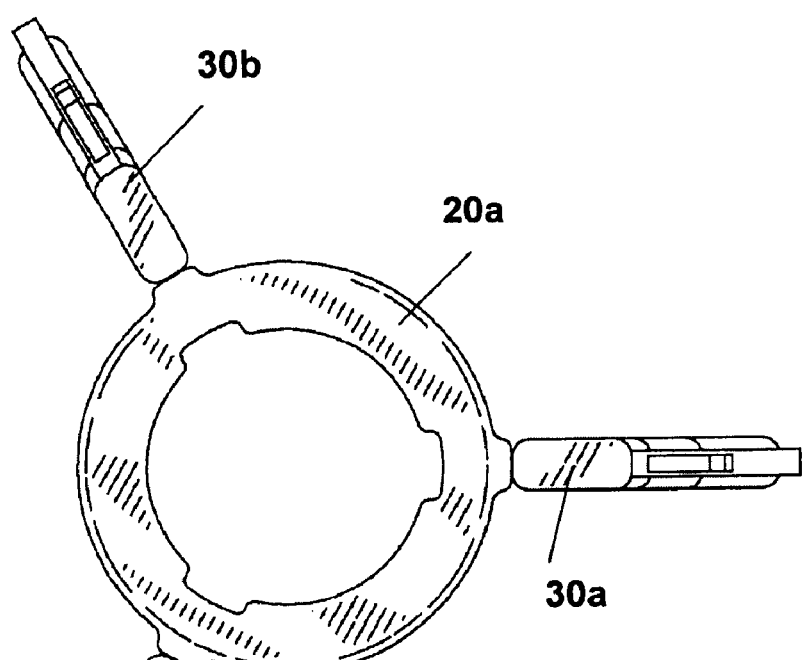
FIG. 4 shows a top view of one shelf attached to the horizontal supports.

A top view of a single shelf 20a that is connected to horizontal supports 30a, 30b, and 30c is shown in FIG. 4.

Figure 5:
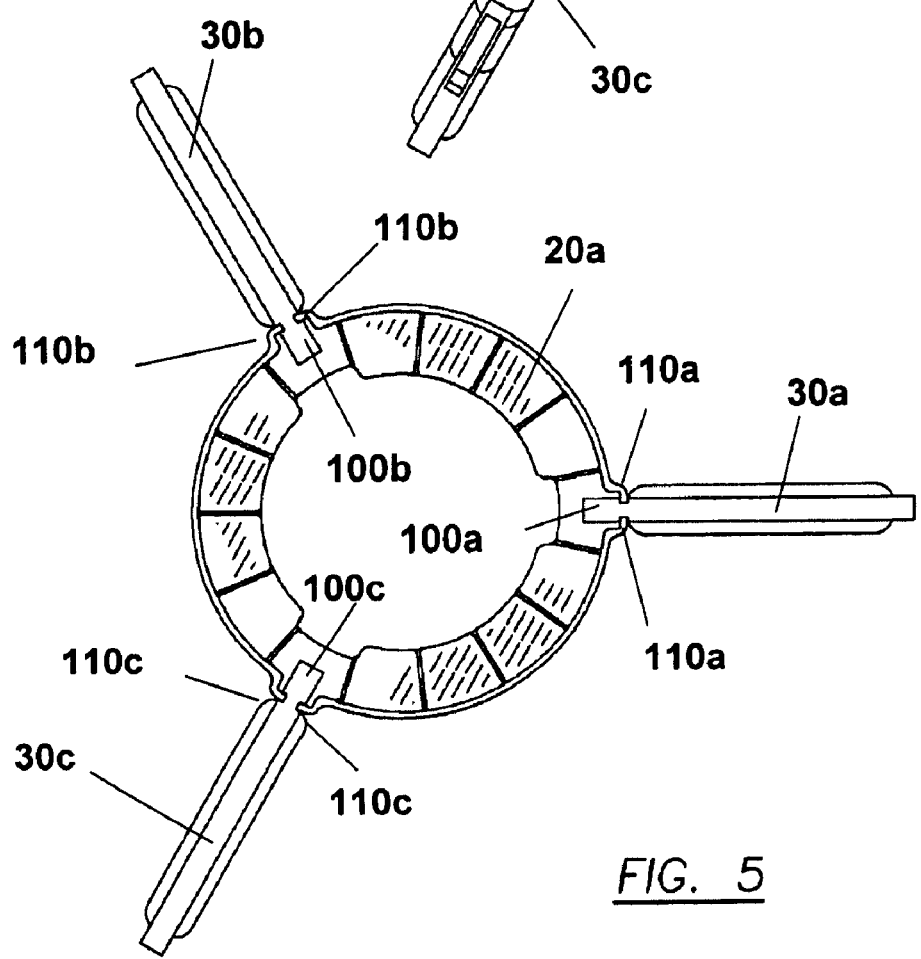
FIG. 5 shows a bottom view of one shelf attached to the horizontal supports.

A bottom view showing one embodiment of the connection of shelf 20a with horizontal shelf supports 30a, 30b, and 30c is shown in FIG. 5. In this embodiment, shelf 20a has six receiving interlock regions that are positioned to form 3 pairs of interlocks 110a, 110b and 110c. Each pair creates a single receiving interlock. The distal end of each of vertical members 30a, 30b, and 30c have interlocks 100a, 100b, and 100c that act in concert with the grasping interlock pairs 110a, 110b, and 110c.

The top surface portions of shelves 20a, 20b and 20c may include a texture surface (not shown) to limit sliding or skidding of any container on said shelves 20a, 20b and/or 20c. The texture has an approximate depth of 0.0045 inches.

Figure 6:
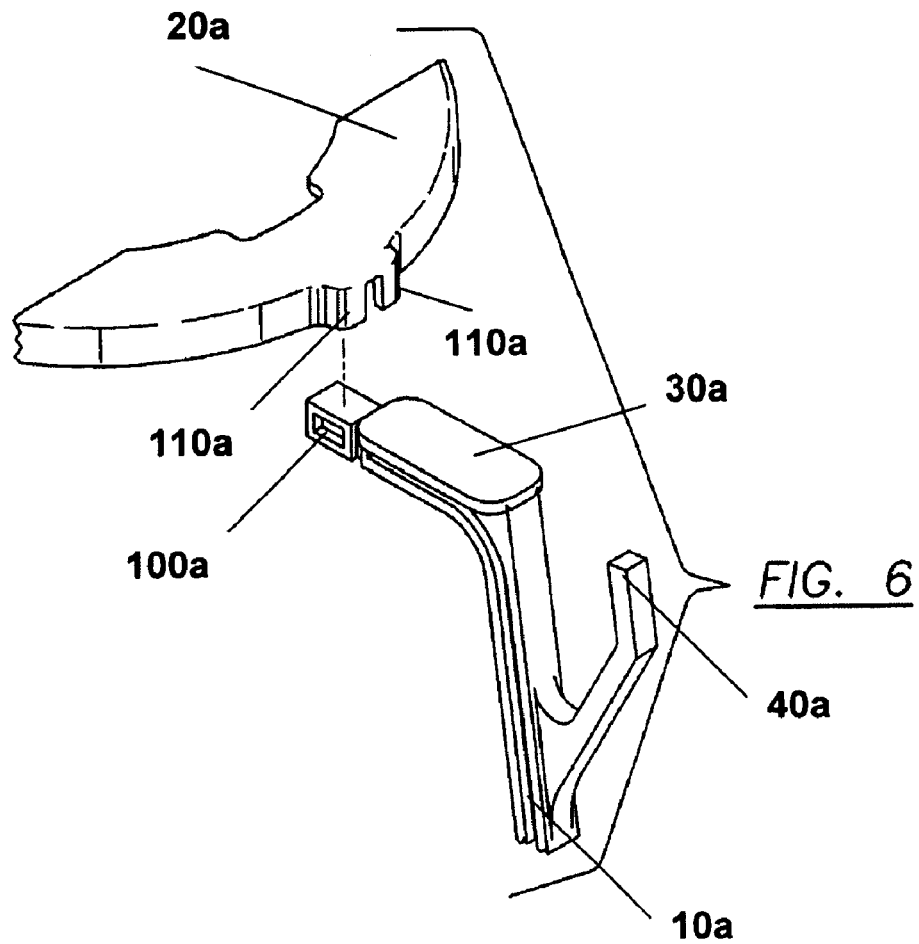
FIG. 6 shows an enlarged view of a shelf in position to be connected to the horizontal support.

FIG. 6 shows shelf 20a with incorporated paired interlocks 110a in position to be attached to interlock 110a that is part of the distal end of horizontal support 30a.

Figure 7:
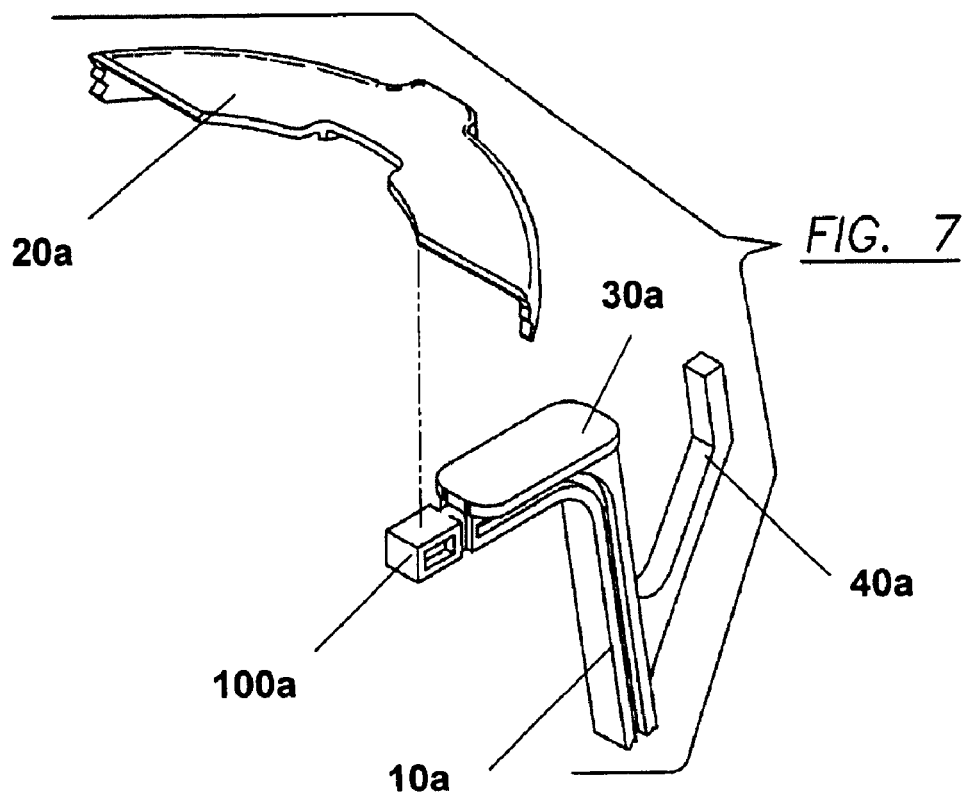
FIG. 7 shows a enlarged view of the connector on the terminal end of a horizontal support.

FIG. 7 shows an enlarged view of the interlock 100a on the terminal end of a horizontal shelf support 30a.

FIG. 8 shows an enlarged side view of horizontal shelf support 30a placed underneath shelf 20a with directional notation of moving horizontal shelf 20a downward in position to be connected to a horizontal support 30a through interaction of incorporated interlock 100a.

FIG. 9 shows a bottom view of a shelf 20a connected to a horizontal shelf support 30a through interaction of paired interlocks 110a with interlock 100a. The figure further shows a transversing line showing the depiction of cut made in the figure that is depicted in FIG. 10.

FIG. 10 shows a sectional view of a shelf 20a connected to a horizontal shelf support 30a, through interaction of interlocks 100a and 110a.

Figure 11:
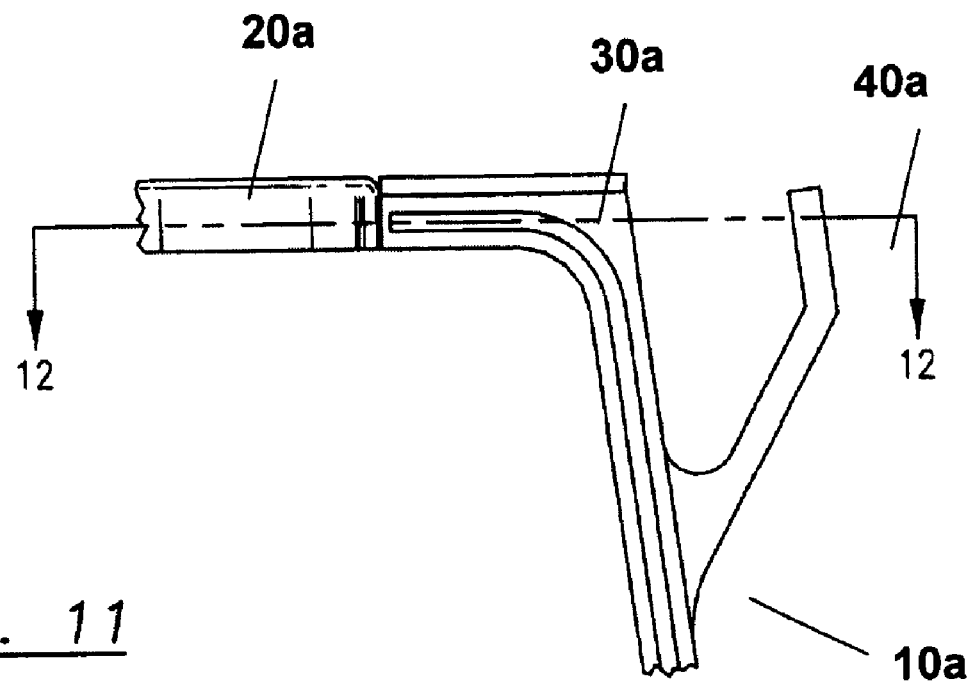
FIG. 11 shows a side view of a shelf connected to a horizontal support.

FIG. 11 shows a side view of shelf 20a connected into position that shows connection with horizontal shelf support 30a. The figure further shows a transversing line showing the depiction of cut made in the figure that shows the view depicted in FIG. 12.

Figure 12:
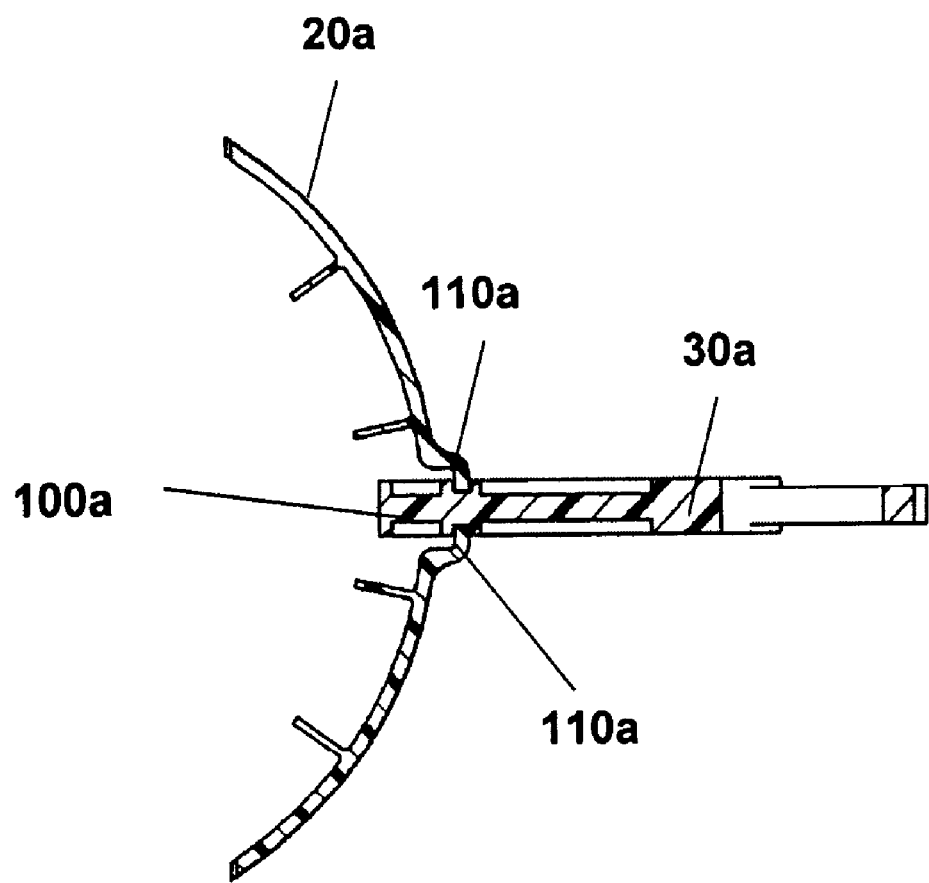
FIG. 12 shows a sectional view of a shelf connected to a horizontal support, from FIG. 11.

FIG. 12 shows a cross sectional view of a shelf 20a connected to a horizontal shelf support 30a, whereby said connection is by the interaction of interlocks 110a with interlock 100a.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:
1. An article for storing pots and pans comprising:
(a) vertical members each having a plurality of respective engaging interlocks, said vertical members being disposed on a circle of a given diameter;

(b) horizontal shelves with receiving interlocks for attaching to said engaging interlocks and securing said shelves in a fixed position, said horizontal shelves being disposed within said circle; and
(c) shelf support members disposed on said vertical members and extending radially inward of said circle, said engaging interlocks being disposed at free ends of said shelf support members.

2. The article for storing pots and pans according to claim 1, wherein said horizontal shelves are disposed entirely within said circle.

3. A device for storing pans, comprising:
vertical members disposed on a circle of a given diameter;
horizontal shelves disposed within said circle;
said vertical members each having respective shelf support members extending radially inward from said circle, each respective said shelf support member being fastened to a respective one of said horizontal shelves for supporting said respective horizontal shelf, each said shelf support member having a respective free end with an engaging interlock and each of said horizontal shelves each having respective receiving interlocks corresponding to each said engaging interlock.

4. The device for storing pans according to claim 3, wherein opposite ends of said vertical members have a respective one of said horizontal shelves.

5. The device for storing pans according to claim 4, wherein at least one of said horizontal shelves is disposed between said horizontal shelves disposed at opposite ends of said vertical members.

6. The device for storing pans according to claim 3, wherein said engaging interlocks are defined by grooves in said shelf support members.

7. The device for storing pans according to claim 3, wherein said shelf support members are stepped to accommodate a thickness of said horizontal shelves to allow said horizontal shelves to be flush with said shelf support members.

8. The device for storing pans according to claim 3, wherein at least one of said vertical members has a hook disposed opposite said shelf support members, said hook projects radially outward from said circle.

9. The device for storing pans according to claim 8, wherein each of said vertical members has a respective said hook.

* * * * *